United States Patent
Das et al.

(10) Patent No.: US 7,342,958 B2
(45) Date of Patent: Mar. 11, 2008

(54) SYSTEM AND METHOD FOR ENHANCING THROUGHPUT IN AN ADDITIVE GAUSSIAN NOISE CHANNEL WITH A PREDETERMINED RATE SET AND UNKNOWN INTERFERENCE

(75) Inventors: Suman Das, Scotch Plains, NJ (US); Thierry E. Klein, Westfield, NJ (US); Sayandev Mukherjee, Plainsboro, NJ (US)

(73) Assignee: Lucent Technologies Inc, Murray Hill, NJ (US)

( * ) Notice: Subject to any disclaimer, the term of this patent is extended or adjusted under 35 U.S.C. 154(b) by 715 days.

(21) Appl. No.: 10/875,755

(22) Filed: Jun. 24, 2004

(65) Prior Publication Data

US 2005/0286621 A1     Dec. 29, 2005

(51) Int. Cl.
*H04B 17/00* (2006.01)
(52) U.S. Cl. ............ 375/227; 375/146; 375/147; 455/450; 455/509; 455/513; 370/524; 370/477; 370/473; 370/347; 370/208
(58) Field of Classification Search ............ 375/227
See application file for complete search history.

(56) References Cited

U.S. PATENT DOCUMENTS

2004/0166869 A1* 8/2004 Laroia et al. ............ 455/450
2004/0243258 A1* 12/2004 Shattil ..................... 700/73
2005/0094675 A1* 5/2005 Bhushan et al. ......... 370/527
2006/0133305 A1* 6/2006 Patwardhan ............. 370/312

OTHER PUBLICATIONS

S. Das, T.E. Klein and S. Mukherjee: "Maximum Throughput for the Additive Gaussian Noise Channel with a Pre-Determined Rate Set and Unknown Interference"; 38th Annual Conference on Information Sciences and Systems (CISS 2004), Mar. 19, 2004, XP002363835; URL:http://www1.bell-labs.com/user/sayan/papers/superpos.pdf.

Youjian Liu et al: "Optimal Rate Allocation for Superposition Coding in Quasi-Statis Fading Channels"; Proceedings 2002 IEEE International Symposium on Information Theory, ISIT 02. Lausanne, Switzerland, Jun. 30-Jul. 5, 2002; IEEE International Symposium on Information Theory, New York, NY, IEEE, US, Jun. 30, 2003 (Jun. 30, 2002), p. 111.

(Continued)

*Primary Examiner*—Chieh M. Fan
*Assistant Examiner*—Siu M Lee (57) ABSTRACT

A system for, and method of, determining channel throughput achievable under superposition coding given a finite, predetermined set of allowed transmission rates and a related system for, and method of, maximizing channel throughput. In one embodiment, the system includes: (1) a noise level calculator configured to calculate associated optimal noise levels for at least some rate subsets of the set of allowed transmission rates and (2) a code feasibility calculator associated with the noise level calculator and configured to determine whether feasible superposition codes exist for the at least some rate subsets given the associated optimal noise levels and thereby identify ones of the at least some rate subsets that are suitable for subsequent wireless transmissions.

24 Claims, 5 Drawing Sheets

OTHER PUBLICATIONS

Cover, T.M.: "Broadcast Channels", IEEE Transactions on Information Theory, IEEE Service Center, Piscataway, NJ, US, vol. IT-18, No. 1, Jan. 1972, pp. 2-4, XP000760860, ISSN: 0018-9448.
Cover; Broadcast Channels; IEEE Transactions on Information Theory; vol. IT-18; Jan. 1972; pp. 2-14.
Bergmans; A Simple Converse for Broadcast Channels with Additive White Gaussian Noise; IEEE Transactions on Information Theory; vol. IT-20; Mar. 1974; pp. 279-280.
Shamai; A Broadcast Strategy for the Gaussian Slowly Fading Channel; in Proceedings of the IEEE International Symposium on Information Theory 1997; Ulm, Germany; Jun. 29-Jul. 4, 1997; p. 150.
Liu, et al; Optimal Rate Allocation for Superposition Coding in Quasi-static Fading Channels; in Proceedings of IEEE International Symposium on Information Theory 2002, Lausanne, Switzerland; Jun. 30-Jul. 5, 2002, p. 111.
Whiting, et al; Optimal Encoding Over Uncertain Channels with Decoding Delay Constraints; in Proceedings of the IEEE International Symposium on Information Theory 2000, Sorrento, Italy, Jun. 25-30, 2000; p. 430.

* cited by examiner

SYSTEM AND METHOD FOR ENHANCING THROUGHPUT IN AN ADDITIVE GAUSSIAN NOISE CHANNEL WITH A PREDETERMINED RATE SET AND UNKNOWN INTERFERENCE

TECHNICAL FIELD OF THE INVENTION

The present invention is directed, in general, to wireless networks and, more specifically, to a system and method for determining throughput for an additive white Gaussian noise (AWGN) channel with a predetermined rate set and unknown interference.

BACKGROUND OF THE INVENTION

Over the last several years, wireless networks have become indispensable tools for carrying voice and data communications for both business and personal use. Wireless networks partition a given geographical region into cells. Each cell is given a base station that serves as the anchor point to the network for all users in the cell. Users are assigned to the different cells based on, for example, channel conditions and network loading.

In current networks, coordination between base stations is not considered; users are only controlled by their assigned base station. However, due to the nature of wireless transmission, users in neighboring cells interfere with the transmission in a given cell. In general, this out-of-cell interference is unknown and uncontrollable. Unfortunately, the performance of the channels in the cell critically depends on the out-of-cell interference since the achievable transmission rate of each channel is related to its signal-to-interference-plus-noise ratio experienced at the receiver.

The network is then faced with the task of determining its maximum average rate of reliable transmission under the uncertainty on the interference level. Cover, in "Broadcast Channels," *IEEE Transactions on Information Theory*, vol. IT-18, pp. 2-14, January 1972 (incorporated herein by reference), defined such compound channels and showed their equivalence to broadcast channels. Cover proposed and analyzed a solution, which he called "superposition coding," for reliable transmission over such channels. In particular, Cover showed that superposition coding achieves larger throughput than time-sharing techniques.

Subsequently, Bergmans, in "A Simple Converse for Broadcast Channels with Additive White Gaussian Noise Maximum Likelihood Decoding," *IEEE Transactions* on Information Theory, vol. IT-20, pp. 279-280, March 1974 (incorporated herein by reference), demonstrated the optimality of superposition coding. The main idea behind superposition coding, as it pertains to channel throughput, is to make sure that some data is correctly received even when the interference is large; additional information can be received when the interference is small.

Shamai, in "A Broadcast Strategy for the Gaussian Slowly Fading Channel," in Proceedings of the IEEE International Symposium on Information Theory 1997, p. 150 (incorporated herein by reference), calculates the maximum throughput achievable under superposition coding, but shows that achieving the maximum throughput requires an infinite number of coding levels. Liu, et al., in "Optimal Rate Allocation for Superposition Coding in Quasi-static Fading Channels," in Proceedings of IEEE International Symposium on Information Theory 2002, p. 111 (incorporated herein by reference), consider only a finite number of levels in the superposition coding and show that the performance achieved with two levels is fairly close to the maximum throughput. However, Liu, et al., assume that the transmitter does not have any information on the state of the channel. On the other hand, Whiting, et al., in "Optimal Encoding over Uncertain Channels with Decoding Delay Constraints," in Proceedings of the IEEE International Symposium on Information Theory 2000, p. 430 (incorporated herein by reference), assume the transmitter to have delayed feedback knowledge about the channel state and a finite decoding delay. Whiting, et al., then provide the maximum achievable average rate using a broadcast approach.

All of the above-referenced prior art approaches have assumed that the transmission rates are of infinite granularity. However, in practical scenarios (due to standard specifications, practical implementations and the cost of building commercial transmitters and receivers), the set of allowed transmission rates is finite and predetermined, and the transmitters are constrained to only use some of these specified rates.

What is needed in the art is a technique for determining the throughput achievable under superposition coding given a finite, predetermined set of allowed transmission rates. What is further needed in the art is a system and a method for performing such technique.

SUMMARY OF THE INVENTION

To address the above-discussed deficiencies of the prior art, the present invention provides, in one aspect, a system for determining channel throughput achievable under superposition coding given a finite, predetermined set of allowed transmission rates. In one embodiment, the system includes: (1) a noise level calculator configured to calculate associated optimal noise levels for at least some rate subsets of the set of allowed transmission rates and (2) a code feasibility calculator associated with the noise level calculator and configured to determine whether feasible superposition codes exist for the at least some rate subsets given the associated optimal noise levels and thereby identify ones of the at least some rate subsets that are suitable for subsequent wireless transmissions.

In another aspect, the present invention provides a method of determining channel throughput achievable under superposition coding given a finite, predetermined set of allowed transmission rates. In one embodiment, the method includes: (1) calculating associated optimal noise levels for at least some rate subsets of the set of allowed transmission rates and (2) determining whether feasible superposition codes exist for the at least some rate subsets given the associated optimal noise levels and thereby identifying ones of the at least some rate subsets that are suitable for subsequent wireless transmissions.

It is assumed that the channel can reliably support at least one of the rates in the pre-determined rate set with an arbitrarily small probability of decoding error. Assuming that the rates need to be chosen from a finite set of predetermined rates leads to a combinatorial optimization problem and significantly contributes to the complexity of the problem. A sequence of propositions culminating in an application of the Kuhn-Tucker theorem to solve a constrained optimization problem will be set forth. This yields an algorithm that optimizes both the subset of transmission rates that ought to be used, and the power allocations to the various rates and the corresponding noise power levels.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

A description of the channel model used herein will now be described, along with the assumptions made and a mathematical formulation of the problem of interest. A single user, point-to-point channel, modeled as a discrete-time, flat fading, additive white Gaussian noise channel with noise variance $\sigma^2$ will be considered. The interference from other users' transmissions is assumed to be time-varying and modeled as a zero-mean, Gaussian random variable (r.v.), which is independent of the thermal noise of the channel. The interference power I, i.e., the variance of this Gaussian r.v., is itself an r.v. chosen according to a known probability density function which depends on the location and the transmission characteristics of the users. The joint effect of the interference and thermal noise will be considered as an equivalent noise process, the power of which is given as $N=I+\sigma^2$, since the interference is assumed to be independent of the thermal noise. A new noise power N is then chosen according to a known probability density function (pdf) $f_N(\cdot)$. This pdf is assumed to be monotone decreasing and have infinite support, taken to be $[0, \infty)$, without loss of generality. It is implicitly assumed that interference cancellation between the different transmitting users is not employed at the receiver. In addition, it is assumed that the received power is upper-bounded by P. Perfect power control is employed to ensure that the received power remains constant and independent of channel condition and the level of interference. This requires that the transmitter has perfect and instantaneous knowledge of the channel gain between the transmitter and the receiver. Finally, it is assumed that a set of M possible rates exists from which the transmitter must choose its transmission rate(s).

The rate set is denoted by R. The elements of an arbitrary subset $R_K$ containing K of these M rates is denoted by $R_K \equiv \{R_1, R_2, \ldots, R_K\}$. Reuse of a rate in a subset is not permitted, i.e., all elements of $R_K$ must be distinct.

Having set forth the applicable channel model, superposition coding will now be described. Given a rate subset $R_K$ of size K, K noise power levels exist, denoted $(N_1, \ldots, N_K)$. Without loss of generality, it is assumed that they are labeled in increasing order:

$$0 \leq N_1 \leq N_2 \leq \ldots \leq N_K. \quad (1)$$

The codewords with rate $R_k$ are allocated power $P_k$, $k=1, \ldots, K$. A superposition decoding scheme operates as follows: a permutation $\pi$ of the set $\{1, \ldots, K\} \rightarrow \{1, \ldots, K\}$ is chosen, and an attempt is made to decode the codeword with rate $R_{\pi(K)}$ at the highest noise level $N_K$. If decoding is successful, the decoded codeword is subtracted from the received codeword. Then, an attempt is made to decode the codeword with rate $R_{\pi(K-1)}$ at the next highest noise level $N_{K-1}$ and that decoded codeword subtracted. This proceeds until all codewords are successfully decoded. In other words, each rate $R_j$ has a power allocation $P_j$, such that at noise power level $N_k$, the codewords of rate $R_{\pi(k)}$ can be decoded, assuming that the codewords with rates $R_{\pi(k+1)}, \ldots, R_{\pi(K)}$ are already decoded and those with rates $R_{\pi(1)}, \ldots, R_{\pi(k-1)}$ are not yet decoded:

$$R_{\pi(k)} = \frac{1}{2} \log \left( 1 + \frac{P_{\pi(k)}}{\sum_{i=1}^{k-1} P_{\pi(i)} + N_k} \right), k = 1, \ldots, K. \quad (2)$$

Note that equation (2) implicitly assumes that Shannon's expression for the capacity of an AWGN channel sets the maximum transmission rate. The natural logarithm is used, so the rate is expressed as nats/s/Hz ("nats" being natural, or $\ln_2$, bits). Equation (2) associates the rate $R_{\pi(k)}$ with the noise power level $N_k$, $k=1, \ldots, K$. Note that equation (2) is equivalent to $$P_{\pi(k)} = \gamma_{\pi(k)} \left[ \sum_{i=1}^{k-1} P_{\pi(i)} + N_k \right], \quad (3)$$

$$\gamma_k = \exp(2R_k) - 1, k=1, \ldots, K. \quad (4)$$

Thus, given $\pi, R_1, \ldots, R_K$ and $N_1, \ldots, N_K$, equation (3) completely determines $P_1, \ldots, P_K$. Further, it is clear from equation (3) that $P_k \geq 0$, $k=1, \ldots, K$. Of course, the total power allocation cannot exceed the available total power P:

$$P \geq P_1 + \ldots + P_K \sum_{k=1}^{K} q_{\pi(k)} N_k, \quad (5)$$

where equation (11) gives $q_{\pi(k)}$, $k=1, \ldots, K$.

Formally, for a given total received power P, rate set $R_K = \{R_1, \ldots, R_K\}$ and permutation $\pi$, if the noise power levels $N=(N_1, \ldots, N_K)$ satisfy equations (1) and (5), $(R_K,$ π, N, P) is called a "superposition coding scheme supporting the rate set $R_K$" with decoding order π, noise power levels N, individual power allocations defined by equation (3), and total (received) power at most P.

The throughput using the superposition coding scheme ($R_K$, π, N, P) is $$T(R_K, \pi, N) = \sum_{k=1}^{K} R_{\pi(k)} \int_0^{N_k} f_N(u) du, \qquad (6)$$

where $f_N(\cdot)$ is the pdf of the noise power. Given a rate set R of size M and total received power P, the goal is to find the superposition coding scheme ($R_K$, π, N, P) that maximizes the throughput given in equation (6). In other words, $$\max_{\substack{K, R_1, \ldots, R_K, \pi, N_1, \ldots, N_K \\ 1 \le K \le M \\ (R_1, \ldots, R_K) \subseteq R \\ 0 \le N_1 \le \ldots \le N_K \\ \sum_{k=1}^{K} q_{\pi(k)} N_k \le P}} \sum_{k=1}^{K} R_{\pi(k)} \int_0^{N_k} f_N(u) du \qquad (7)$$

which is equivalent to $$\max_{K \in \{1, \ldots, M\}} \max_{\{R_1, \ldots, R_K\} \subseteq R} \max_{\pi: \{1, \ldots, K\} \to \{1, \ldots, K\}} \max_{\substack{N_1, \ldots, N_K \\ 0 \le N_1 \le \ldots \le N_K \\ \sum_{k=1}^{K} q_{\pi(k)} N_K \le P}} T(R_1, \ldots, R_K, \pi, N_1, \ldots, N_K), \qquad (8)$$

where equation (6) gives T. The first three optimizations in equation (8) are computed by searching over all $2^M - 1$ nonempty subsets of the given rate set R, and all K! permutations on each subset of size K, K=1, ..., M. The innermost optimization for a given subset $\{R_1, \ldots, R_K\}$ and π is that of maximizing the throughput subject to equations (1) and (5):

$$\max_{\substack{N_1, \ldots, N_K: \\ 0 \le N_1 \le \ldots \le N_K \\ \sum_{k=1}^{K} q_{\pi(k)} N_K \le P}} \sum_{k=1}^{K} R_{\pi(k)} \int_0^{N_k} f_N(u) du \qquad (9)$$

If the maximum throughput from the optimization problem of equation (9) is denoted $T^*(R_1, \ldots, R_K, \pi)$, the following three propositions and theorem result:

Proposition 1: Let $(N^*_1, \ldots, N^*_K)$ achieve the maximum in equation (9), and suppose $N_1^* = 0$. Then $$T^*(R_1, \ldots, R_K, \pi) = T^*(R'_1, \ldots, R'_{K-1}, \pi')$$

where $R_{\pi(1)}$ is dropped from the original rate subset $R_K$ to yield the reduced rate subset $R_{K-1} = \{R'_1, \ldots, R'_{K-1}\}$, and π' is the restriction of the original permutation π to $R_{K-1}$.

Proposition 2: Suppose the noise power probability density function $f_N(\cdot)$ is continuous and monotone decreasing. Then, for any rate subset $\{R_1, \ldots, R_K\}$ and permutation π, the throughput $T(R_1, \ldots, R_K, \pi, N_1, \ldots, N_K)$, viewed as a function of $N_1, \ldots, N_K$, is a concave continuously differentiable mapping from the open convex set $R^K_{++}$ into R.

Proposition 3: Given a rate subset $\{R_1, \ldots, R_K\}$ and permutation π: $\{1, \ldots, K\} \to \{1, \ldots, K\}$, and noise power levels $N_1, \ldots, N_K$:

(a) The values of $P_k$ obtained from equation (3) satisfy the following property:

$$\sum_{i=1}^{K} P_{\pi(i)} = \sum_{i=1}^{K} q_{\pi(i)} N_i, \qquad (10)$$

$$q_{\pi(i)} = \gamma_{\pi(i)} \prod_{j=i+1}^{K} (1 + \gamma_{\pi(j)}), \quad 1 \le i \le K \qquad (11)$$

(b) For all $m \ge 1$, $$\frac{R_{\pi(i)}}{q_{\pi(i)}} < \frac{\sum_{j=0}^{m} R_{\pi(i+j)}}{\sum_{j=0}^{m} q_{\pi(i+j)}}, \qquad (12)$$

Theorem: Let the pdf of the noise power, $f_N(\cdot)$, be monotone decreasing with infinite support. For a given rate subset $R_1, \ldots, R_K$, permutation π, and maximum received power P, $T(R_1, \ldots, R_K, \pi, N)$ has a global maximum at $(N^*_1, \ldots, N^*_K)$ [over the set of all $N^*$ with $0 < N_1^* \le N_2^* \le \ldots \le N_K^*$] if and only if λ>0 exists such that $$f_N(N_i^*) \frac{R_{\pi(i)}}{q_{\pi(i)}} = \lambda, \quad i = 1, \ldots, K, \qquad (13)$$

$$\sum_{i=1}^{K} q_{\pi(i)} N_i^* = P. \qquad (14)$$

From equation (13), it follows that $N^*_1 > 0$ guarantees λ>0. Thus the only condition to be checked for a critical point $(N^*_1, \ldots, N^*_K)$ obtained by solving equation (13) is $$N_1^* = \frac{P - \sum_{i=2}^{K} q_{\pi(i)} N_i^*}{q_{\pi(i)}} > 0 \qquad (15)$$

The theorem leads to a general algorithm for computing optimal noise levels for any decreasing noise pdf. However, the algorithm can be significantly simplified if the noise pdf is assumed to decrease in an exponential manner. Under the additional assumption that $f_N(\cdot)$ is exponential, the optimal noise levels can be explicitly calculated in a recursive fashion for any permutation. This yields an algorithm to determine the maximum throughput and the throughput-maximizing set of discrete noise levels and the associated power allocation.

Let the noise power pdf be denoted by $f_N(n) = \alpha \exp(-\alpha n)$, for n>0, where α>0 is a known parameter. Equation (13), evaluated for consecutive noise levels, can now be used to find a relation between $N^*_i$ and $N^*_1$:

$$f_N(N_i^*)\frac{R_{\pi(i)}}{q_{\pi(i)}} = \lambda = f_N(N_{i+1}^*)\frac{R_{\pi(i+1)}}{q_{\pi(i+1)}} \quad (16)$$

$$\Leftrightarrow N_{i+1}^* = N_i^* + x_{\pi(i)},$$

$$\Leftrightarrow N_i^* = N_1^* + \sum_{j=1}^{i-1} x_{\pi(j)},$$

in which the parameters $x_{\pi(i)}$ are calculated according to the following equation:

$$x_{\pi(i)} = \frac{1}{\alpha}\log\left(\frac{R_{\pi(i+1)}}{R_{\pi(i)}}\frac{\gamma_{\pi(i)}(1+\gamma_{\pi(i+1)})}{\gamma_{\pi(i+1)}}\right), \quad (17)$$

with $N^*_1$ determined from the power constraint:

$$\sum_{j=1}^{K} q_{\pi(j)} N_j^* = P \quad (18)$$

$$\Leftrightarrow N_1^* = \frac{P - \sum_{j=1}^{K-1}\left(\sum_{i=j+1}^{K} q_{\pi(i)}\right) x_{\pi(j)}}{\sum_{j=1}^{K} q_{\pi(j)}}.$$

The only remaining feasibility condition of the above solution that remains to be checked is:

$$N_1^* > 0 \Leftrightarrow \sum_{j=1}^{K-1}\left(\sum_{i=j+1}^{K} q_{\pi(i)}\right) x_{\pi(j)} < P. \quad (19)$$

The above results may now be put together to result in the following algorithm for determining the throughput-optimal set of transmission rates and the corresponding set of discrete noise levels when the noise pdf is exponentially decreasing.

Step 1: Let K=1 (this is the number of transmission rates chosen from the original rate set).

Step 2: Choose a subset of K rates from the original set, denoted $\{R_1, \ldots, R_K\}$.

Step 3: For each permutation $\pi$, do the following:

3.1: Determine the parameters $q_{\pi(i)}$ and $x_{\pi(i)}$ for the chosen rate subset, for i=1, ..., K−1, from equations (11) and (17) respectively.

3.2: If equation (19) is satisfied, then a feasible superposition code exists supporting this rate subset with decoding order specified by $\pi$, and the noise levels can be calculated from equations (17), (18) and (16), in that order. Finally the achieved throughput for the chosen rate subset R is given by:

$$T^*(R_1, \ldots, R_K, \pi) = \sum_{i=1}^{K}[1 - e^{-\alpha N_i^*}]R_{\pi(i)}. \quad (20)$$

3.3: If on the other hand equation (19) is not satisfied, no superposition code exists using decoding order $\pi$ supporting the chosen rate subset for the given power constraint.

3.4: Repeat Steps 3.1-3.3 for each permutation on the given rate subset $\{R_1, \ldots, R_K\}$ chosen in Step 2.

Step 4: For a given K, choose all possible rate subsets of size K and repeat the operations in Steps 3.1-3.4.

Step 5: Repeat the operations in Steps 2 through 4 for all possible sizes of the rate subset by varying K from 1 to M, where M is the number of rates in the original rate subset, from which the rate subset has to be chosen. At the end of this step, the throughput values for all possible feasible rate subsets and permutations should be in hand.

Step 6: Choose the largest value of the achievable throughputs obtained in Steps 3.1-3.4 for the different rate subsets under consideration.

Note that the above procedure can be repeated for different received power constraints P to obtain the maximum achieved throughput under superposition coding as a function of the received power, or equivalently as a function of the transmit power (if the relation between transmit and receive power is known).

Further, the algorithm works for arbitrary monotone decreasing $f_N(\cdot)$ if equations (17), (18) and (16) are all replaced by equations (13) and (14) to solve for the optimal noise power levels and if equation (19) is replaced by equation (15) in which the appropriate values for the noise power levels are used. Finally, in Step 3.2, the throughput T for a given rate subset and a given permutation $\pi$ is calculated according to equation (6).

Figure 1:
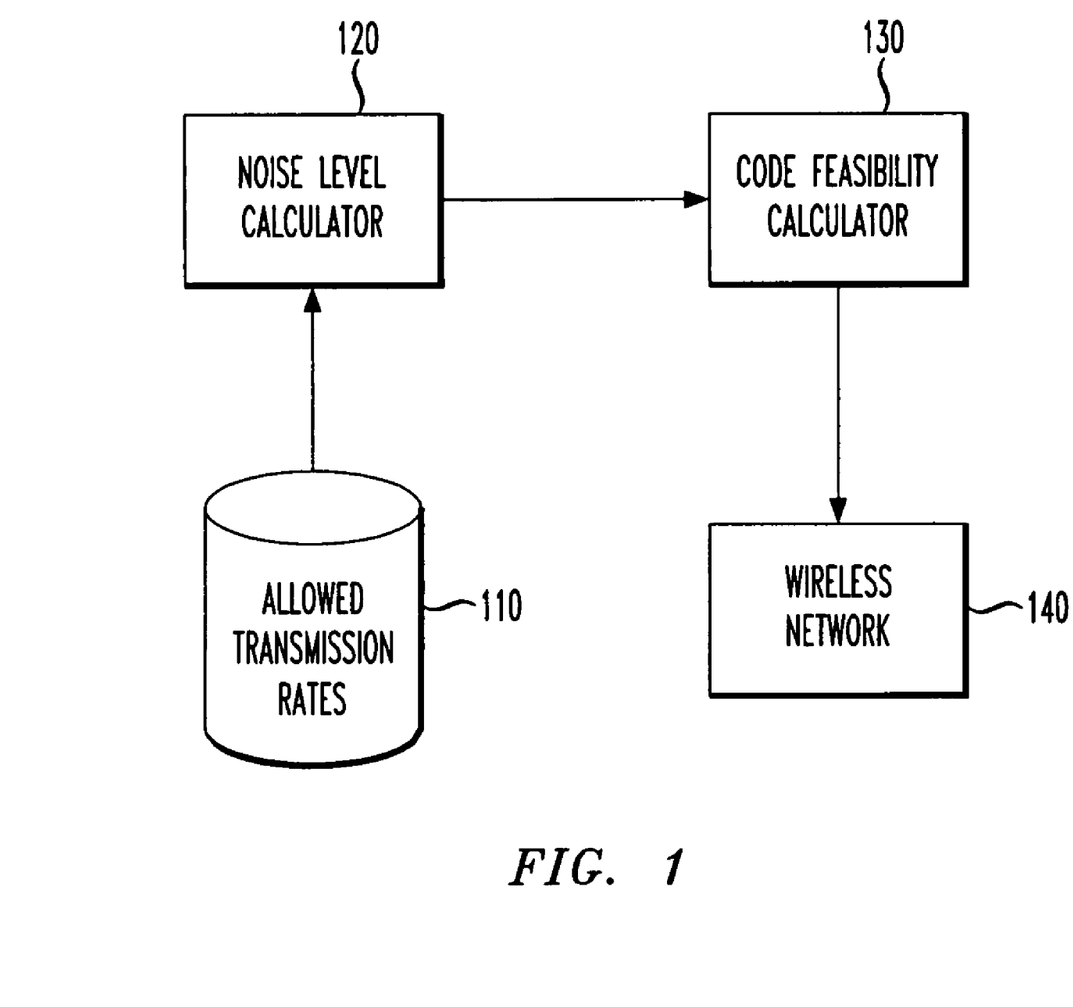
FIG. 1 illustrates a block diagram of one embodiment of a system for determining the throughput achievable under superposition coding given a finite, predetermined set of allowed transmission rates constructed according to the principles of the present invention.

Having set forth an algorithm for determining the throughput-optimal set of transmission rates and the corresponding set of discrete noise levels, a system configured to operate in accordance with the principles of the algorithm may now be illustrated. Accordingly, FIG. 1 illustrates a block diagram of one embodiment of a system for determining the throughput achievable under superposition coding given a finite, predetermined set of allowed transmission rates constructed according to the principles of the present invention.

A database 110 contains the finite, predetermined set of allowed transmission rates from which the subsets are chosen for analysis. In the illustrated embodiment, a conventional or later-established industry transmission standard determines the set. Proprietary transmission rates may alternatively occupy the set.

A noise level calculator 120 is coupled to the database 110. The noise level calculator 120 is configured to calculate associated optimal noise levels for at least some rate subsets of the set of allowed transmission rates. In doing so, the illustrated embodiment of the noise level calculator 120 chooses subsets containing one or more transmission rates, but of fewer members than the entire set.

In the illustrated embodiment, the noise level calculator is configured to calculate associated optimal noise levels for all rate subsets of the set of allowed transmission rates as the algorithm set forth above does. Further, the illustrated embodiment of the noise level calculator employs equations that at least approximate equations (11) and (17) above to find the parameters $q_{\pi(i)}$ and $x_{\pi(i)}$ for each rate subset. $N_1$ and $N_i$ can also be calculated as desired. "At least approximate" means that the equations may not be exactly as those set forth above, but achieve substantially the same result. Of course, any suitable equation or equations for determining optimal noise levels fall within the broad scope of the present invention.

A code feasibility calculator 130 is associated with the noise level calculator 120. The code feasibility calculator 130 is configured to determine whether feasible superposition codes exist for the at least some rate subsets given the associated optimal noise levels. The rate subsets lacking feasible superposition codes are disregarded. The rate subsets having feasible superposition codes are suitable for subsequent wireless transmissions.

The illustrated embodiment of the code feasibility calculator 130 is further configured to determine throughputs associated with the ones of the at least some rate subsets. Further, the illustrated embodiment of the code feasibility calculator 130 employs an equation that at least approximates equation (20), respectively equation (6). Of course, any suitable equation or equations for determining throughputs fall within the broad scope of the present invention.

The illustrated embodiment of the code feasibility calculator 130 is further configured to select a one of the at least some rate subsets having a maximum associated throughput. It is assumed that maximizing throughput is the desired objective, though the broad scope of the present invention is not so limited.

Having selected the one (feasible) rate subset having the maximum associated throughput, the illustrated embodiment of the code feasibility calculator 130 is further configured to calculate power allocations for rates in the selected rate subset. The code feasibility calculator 130 can then provide the appropriate rate subset and power allocation for the various rates in the subset to a wireless network 140 for subsequent transmissions.

Figure 2:
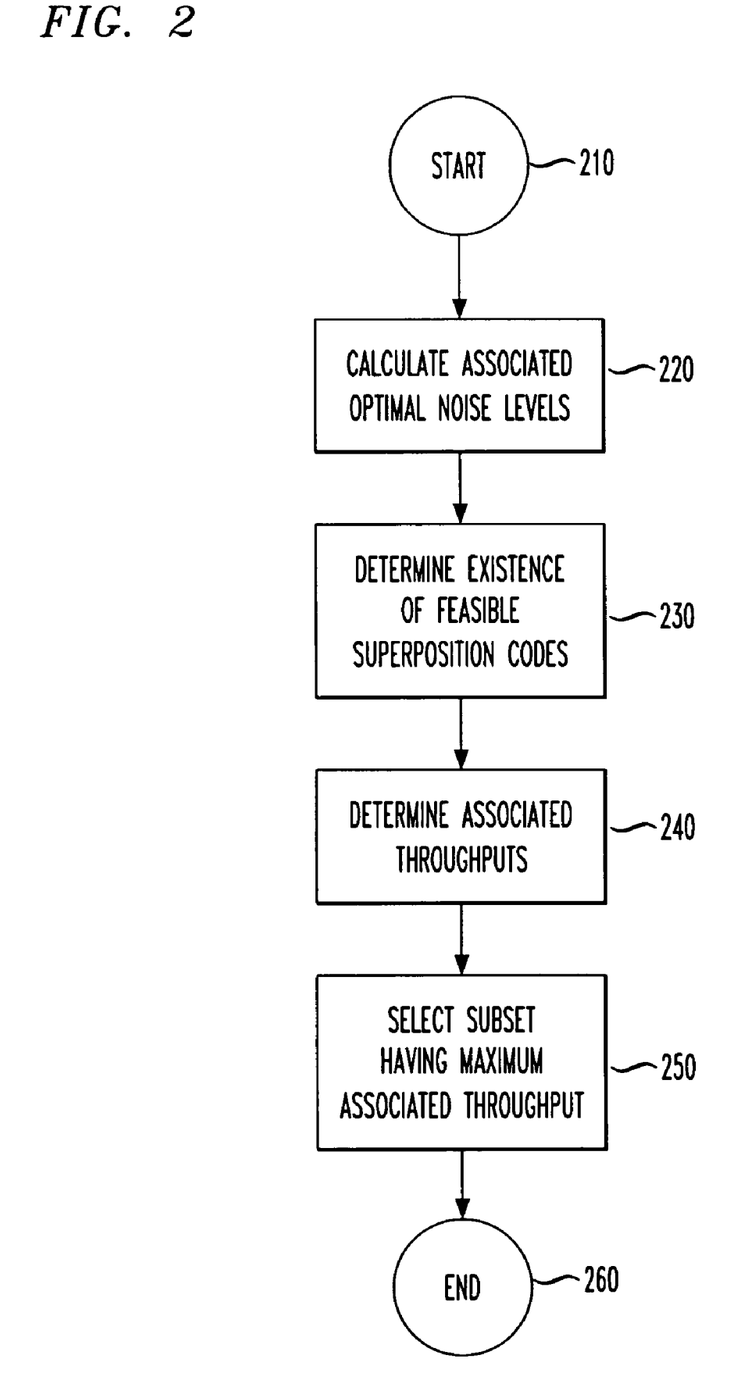
FIG. 2 illustrates a flow diagram of one embodiment of a method of determining the throughput achievable under superposition coding given a finite, predetermined set of allowed transmission rates carried out according to the principles of the present invention.

Turning now to FIG. 2, illustrated is a flow diagram of one embodiment of a method of determining the throughput achievable under superposition coding given a finite, predetermined set of allowed transmission rates carried out according to the principles of the present invention.

The method begins in a start step 210, wherein it is desired to determine channel throughput achievable under superposition coding given a finite, predetermined set of allowed transmission rates. The method proceeds to a step 220 in which associated optimal noise levels are calculated for at least some rate subsets of the set of allowed transmission rates. Next, in a step 230, the existence of feasible superposition codes for the at least some rate subsets given the associated optimal noise levels is determined. Rate subsets that are suitable for subsequent wireless transmissions are thereby identified.

Then, in a step 240, associated throughputs for the suitable rate subsets are determined. Next, in a step 250, the rate subset having the maximum associated throughput is selected. The method ends in an end step 260 wherein, in the illustrated embodiment, power levels for the rates in the selected rate subset are determined and given over to a wireless network for subsequent transmissions.

Some numerical results will now be presented to illustrate the performance of the superposition coding scheme when the pdf of noise power is exponential with parameter $\alpha$, for various choices of $\alpha$. The set of available rates (again expressed in nats/s/Hz) is $\{2, 1, 2/3, 1/2, 1/3, 1/4, 1/5\}$. The power P and the noise power levels $N^*_1, \ldots, N^*_K$ are normalized by dividing them by the mean noise power $\bar{N}=1/\alpha$. Thus P may be replaced in the optimization problem by the signal-to-noise ratio (SNR) $P/\bar{N}$, where $N^*_1, \ldots, N^*_K$ now refer to the noise power levels normalized by the mean.

Figure 3:
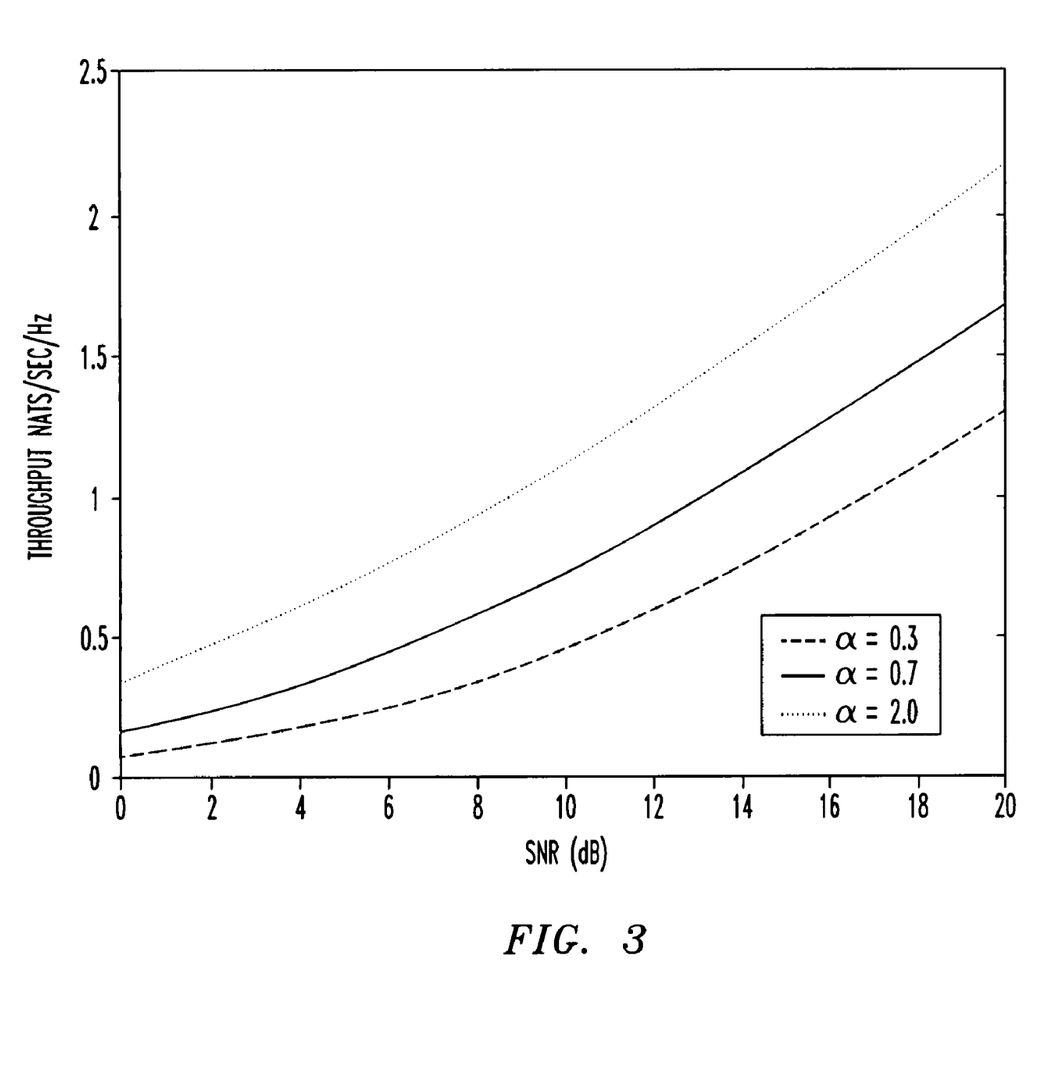
FIG. 3 illustrates a graph of signal-to-noise ratio (SNR) versus optimal throughput using superposition coding for different values of mean noise power $1/\alpha$, when the pdf of the noise power is exponential.
Figure 4:
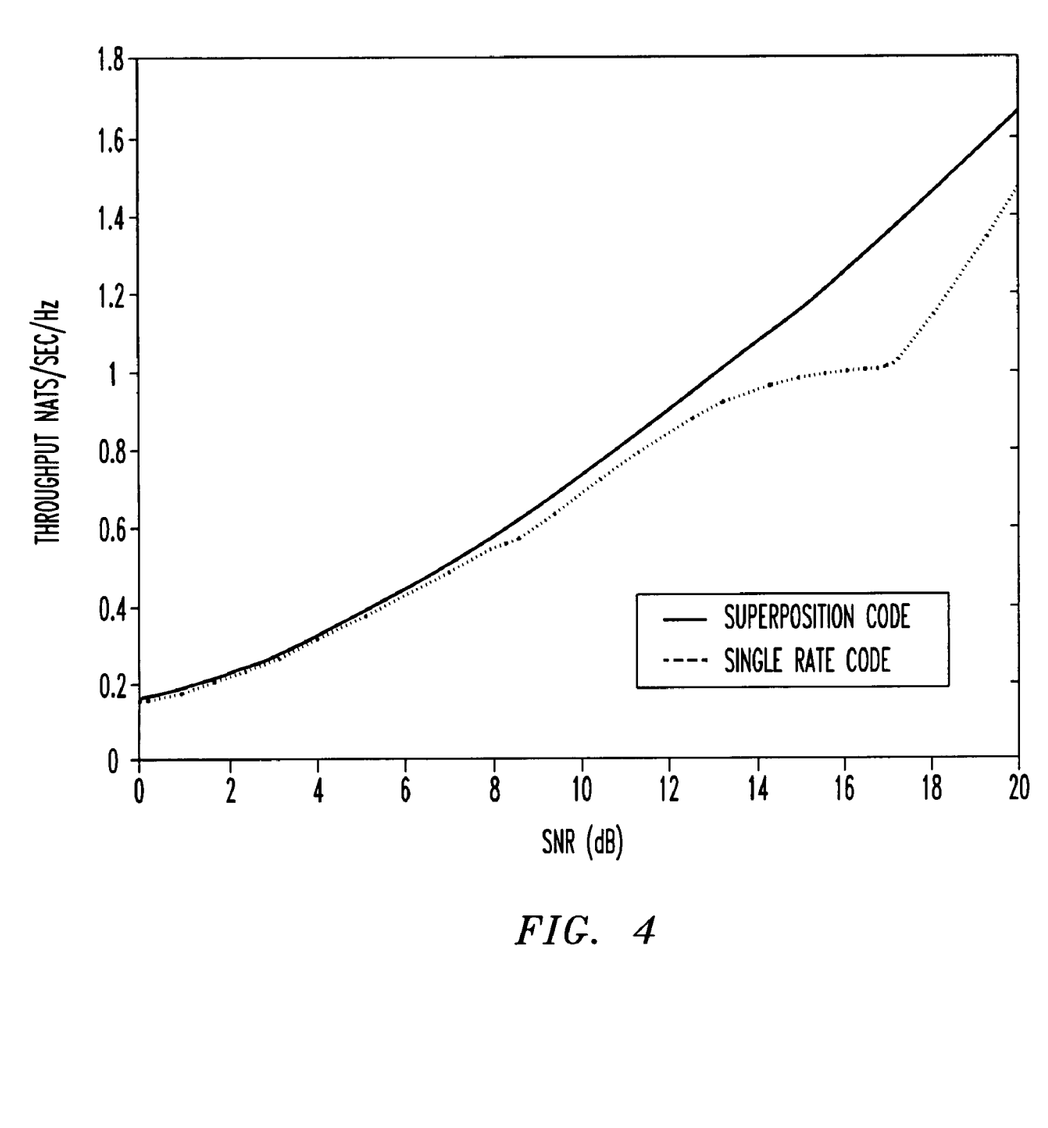
FIG. 4 illustrates a graph of SNR versus optimal throughput using superposition coding, both when the optimal rate subset for each SNR is unrestricted, and when it is forced to be of size 1 (single-rate coding), for $\alpha=0.7$.
Figure 5:
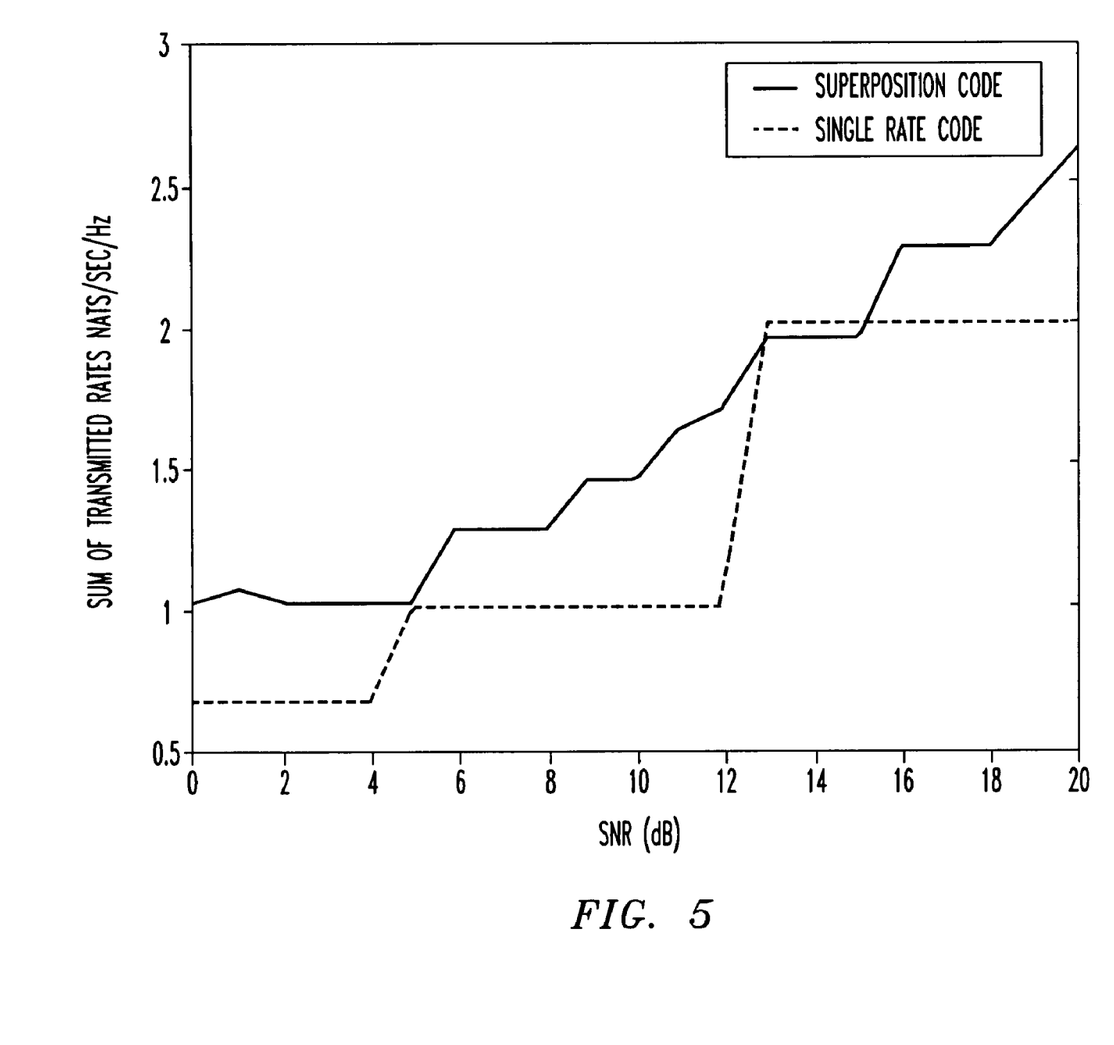
FIG. 5 illustrates a graph of SNR versus the sum of the rates in the optimal rate subset for superposition and single-rate coding, for $\alpha=0.7$.

The results are plotted in FIGS. 3, 4 and 5. In each of them, SNR is plotted versus the maximal throughput for this SNR. The maximal throughput is the throughput given by equation (20) for the best rate subset and the best permutation over this rate subset, with $N^*_1, \ldots, N^*_K$ obtained from equations (17), (18) and (16).

Turning to FIG. 3, shown are throughput versus SNR curves for different values of the mean noise power $1/\alpha$, when the pdf of the noise power is exponential. For a given SNR, the maximal throughput increases as mean noise power decreases, i.e., as $\alpha$ increases. Turning to FIG. 4, $\alpha$ is set equal to 0.7 and the maximal throughput is plotted using a superposition code versus SNR, and this is compared to the maximal throughput when only one rate is permitted to be used out of the rate subset. The difference in throughput between the two curves represents the gain due to superposition coding.

For low SNRs, the two throughputs are close, but start to diverge as SNR increases. The reason for this widening gap is that as more power is available, the superposition code can take advantage of it to use rate subsets with finer granularity than if only use a single rate is used. In particular, the slope of the single-rate throughput curve changes discontinuously at an SNR of approximately 18 dB. At this point, the SNR is high enough that a higher rate is feasible as the single-rate code, so this curve then starts to climb up toward the superposition code curve.

In FIG. 5, the sum of the rates in the optimal rate subset is plotted for $\alpha=0.7$, for both superposition and single-rate coding versus SNR. As available power rises, the sum of the rates in the optimal rate subset rises as well, except for the initial drop in the superposition code sum-rate at very low SNR. However, since the single-rate code can only use one rate, this optimal rate rises in bigger jumps than for the superposition code, which can use higher rates when power is available, with finer granularity than if only a single rate is used.

In general, the size of the optimal rate subset used in the superposition code increases with SNR. However, a pattern could not be readily identified in the optimal permutations over these optimal rate subsets. In fact, situations arose where the optimal rate subset was the same at two different SNRs, but the optimal permutations were different.

Although the present invention has been described in detail, those skilled in the art should understand that they can make various changes, substitutions and alterations herein without departing from the spirit and scope of the invention in its broadest form.

What is claimed is:

1. A system for determining channel throughput achievable under superposition coding given a finite, predetermined set of allowed transmission rates, comprising:
    a noise level calculator configured to calculate associated optimal noise levels for at least some rate subsets of said set of allowed transmission rates; and
    a code feasibility calculator associated with said noise level calculator and configured to determine whether feasible superposition codes exist for said at least some rate subsets given said associated optimal noise levels and thereby identify ones of said at least some rate subsets that are suitable for subsequent wireless transmissions.

2. The system as recited in claim 1 wherein said noise level calculator is configured to calculate said associated optimal noise levels using an equation that at least approximates:

$$q_{\pi(i)} = \gamma_{\pi(i)} \prod_{j=i+1}^{K} (1 + \gamma_{\pi(j)}), \quad 1 \le i \le K,$$

where:
  K is a number of rates in a subset $R_k$ of said predetermined set of allowed transmission rates,
  $\gamma_{\pi(i)} = \exp(2R_{\pi(i)}) - 1$, for a permutation $\pi$ of said subset, and
  $R_{\pi(i)}$ is the $i^{th}$ transmission rate in said permutation.

3. The system as recited in claim 1 wherein said noise level calculator is configured to calculate said associated optimal noise levels using an equation that at least approximates:

$$x_{\pi(i)} = \frac{1}{\alpha} \log\left( \frac{R_{\pi(i+1)}}{R_{\pi(i)}} \frac{\gamma_{\pi(i)}(1 + \gamma_{\pi(i+1)})}{\gamma_{\pi(i+1)}} \right),$$

where:
  $\alpha$ is an adjustable parameter,
  $\gamma_{\pi(i)} = \exp(2R_{\pi(i)}) - 1$, for a permutation $\pi$ of a subset $R_k$ of said predetermined set of allowed transmission rates, and
  $R_{\pi(i)}$ is an $i^{th}$ transmission rate in said permutation.

4. The system as recited in claim 1 wherein said noise level calculator is configured to calculate relationships between noise levels using equations that at least approximate:

$$N_1^* = \frac{P - \sum_{j=1}^{K-1}\left(\sum_{i=j+1}^{K} q_{\pi(i)}\right) x_{\pi(i)}}{\sum_{j=1}^{K} q_{\pi(j)}} \text{ and } N_i^* = N_1^* + \sum_{j=1}^{i-1} x_{\pi(j)},$$

where:
  P is a total received power,
  K is a number of rates in a subset $R_k$ of said predetermined set of allowed transmission rates, $$q_{\pi(i)} = \gamma_{\pi(i)} \prod_{j=i+1}^{K} (1 + \gamma_{\pi(j)}), 1 \le i \le K,$$

$$x_{\pi(j)} = \frac{1}{\alpha} \log\left( \frac{R_{\pi(i+1)}}{R_{\pi(i)}} \frac{\gamma_{\pi(i)}(1 + \gamma_{\pi(i+1)})}{\gamma_{\pi(i+1)}} \right),$$

$\alpha$ is an adjustable parameter,
  $\gamma_{\pi(i)} = \exp(2R_{\pi(i)}) - 1$, for a permutation $\pi$ of said subset, and
  $R_{\pi(i)}$ is an $1^{th}$ transmission rate in said permutation.

5. The system as recited in claim 1 wherein said code feasibility calculator is further configured to determine throughputs associated with said ones of said at least some rate subsets.

6. The system as recited in claim 5 wherein said code feasibility calculator is configured to determine throughputs using an equation that at least approximates:

$$T^*(R_1, \ldots, R_K, \pi) = \sum_{i=1}^{K} [1 - e^{-\alpha N_i^*}] R_{\pi(i)},$$

where:
  $R_k$ is a $k^{th}$ transmission rate in a subset of K of said predetermined set of allowed transmission rates,
  $\pi$ is a permutation of said subset,
  $R_{\pi(i)}$ is an $i^{th}$ transmission rate in said permutation,
  $\alpha$ is an adjustable parameter, and
  $N_i^*$ is a noise power level associated with said $i^{th}$ transmission rate, wherein a set of $N_1^*, \ldots, N_K^*$ is associated with a maximum of said channel throughput.

7. The system as recited in claim 5 wherein said code feasibility calculator is further configured to select a one of said at least some rate subsets having a maximum associated throughput.

8. The system as recited in claim 1 wherein said code feasibility calculator is further configured to calculate power allocations for rates in at least one of said at least some rate subsets.

9. The system as recited in claim 8 wherein said code feasibility calculator is further configured to calculate said power allocations using an equation that at least approximates:

$$P_{\pi(k)} = \gamma_{\pi(k)}\left[\sum_{i=1}^{k-1} P_{\pi(i)} + N_k\right],$$

where:
  $\gamma_{\pi(k)} = \exp(2R_{\pi(k)}) - 1$, for a permutation $\pi$ of a subset $R_k$ of said predetermined set of allowed transmission rates,
  $P_{\pi(i)}$ is an allocated power associated with an $i^{th}$ transmission rate in said permutation, and
  $N_k$ is a noise power level associated with a $k^{th}$ transmission rate in said subset.

10. The system as recited in claim 1 wherein said at least some rate subsets include subsets of single rates.

11. The system as recited in claim 1 wherein said noise level calculator is configured to calculate associated optimal noise levels for all rate subsets of said set.

12. The system as recited in claim 1 wherein a transmission standard determines said set.

13. A method of determining channel throughput achievable under superposition coding given a finite, predetermined set of allowed transmission rates, comprising:
  calculating associated optimal noise levels for at least some rate subsets of said set of allowed transmission rates; and
  determining whether feasible superposition codes exist for said at least some rate subsets given said associated optimal noise levels and thereby identifying ones of said at least some rate subsets that are suitable for subsequent wireless transmissions.

14. The method as recited in claim 13 wherein said calculating comprises calculating said associated optimal noise levels using an equation that at least approximates:

$$q_{\pi(i)} = \gamma_{\pi(i)} \prod_{j=i+1}^{K} (1 + \gamma_{\pi(j)}), \quad 1 \leq i \leq K,$$

where:
- K is a number of rates in a subset $R_k$ of said predetermined set of allowed transmission rates,
- $\gamma_{\pi(i)} = \exp(2R_{\pi(i)}) - 1$, for a permutation $\pi$ of said subset, and
- $R_{\pi(i)}$ is the $i^{th}$ transmission rate in said permutation $\pi$.

15. The method as recited in claim 13 wherein said calculating comprises calculating said associated optimal noise levels using an equation that at least approximates:

$$x_{\pi(i)} = \frac{1}{\alpha} \log\left( \frac{R_{\pi(i+1)}}{R_{\pi(i)}} \frac{\gamma_{\pi(i)}(1 + \gamma_{\pi(i+1)})}{\gamma_{\pi(i+1)}} \right),$$

where:
- $\alpha$ is an adjustable parameter,
- $\gamma_{\pi(i)} = \exp(2R_{\pi(i)}) - 1$, for a permutation $\pi$ of a subset $R_k$ of said predetermined set of allowed transmission rates, and
- $R_{\pi(i)}$ is an $i^{th}$ transmission rate in said permutation.

16. The method as recited in claim 13 wherein said calculating comprises calculating relationships between noise levels using equations that at least approximate:

$$N_1^* = \frac{P - \sum_{j=1}^{K-1} \left( \sum_{i=j+1}^{K} q_{\pi(i)} \right) x_{\pi(i)}}{\sum_{j=1}^{K} q_{\pi(j)}} \quad \text{and} \quad N_i^* = N_1^* + \sum_{j=1}^{i-1} x_{\pi(j)},$$

where:
- P is a total received power,
- K is a number of rates in a subset $R_k$ of said predetermined set of allowed transmission rates, $$q_{\pi(i)} = \gamma_{\pi(i)} \prod_{j=i+1}^{K} (1 + \gamma_{\pi(j)}), 1 \leq i \leq K,$$

$$x_{\pi(j)} = \frac{1}{\alpha} \log\left( \frac{R_{\pi(i+1)}}{R_{\pi(i)}} \frac{\gamma_{\pi(i)}(1 + \gamma_{\pi(i+1)})}{\gamma_{\pi(i+1)}} \right),$$

- $\alpha$ is an adjustable parameter,
- $\gamma_{\pi(i)} = \exp(2R_{\pi(i)}) - 1$, for a permutation $\pi$ of said subset, and
- $R_{\pi(i)}$ is an $i^{th}$ transmission rate in said permutation.

17. The method as recited in claim 13 wherein said determining comprises determining throughputs associated with said ones of said at least some rate subsets.

18. The method as recited in claim 17 wherein said determining comprises determining throughputs using an equation that at least approximates:

$$T^*(R_1, \ldots, R_K, \pi) = \sum_{i=1}^{K} [1 - e^{-\alpha N_i^*}] R_{\pi(i)},$$

where:
- $R_k$ is a $k^{th}$ transmission rate in a subset of K of said predetermined set of allowed transmission rates,
- $\pi$ is a permutation of said subset,
- $R_{\pi(i)}$ is an $i^{th}$ transmission rate in said permutation,
- $\alpha$ is an adjustable parameter, and
- $N_i^*$ is a noise power level associated with said $i^{th}$ transmission rate, wherein a set of $N_1^*, \ldots, N_k^*$ is associated with a maximum of said channel throughput.

19. The method as recited in claim 17 further comprising selecting a one of said at least some rate subsets having a maximum associated throughput.

20. The method as recited in claim 13 wherein said determining comprises calculating power allocations for rates in at least one of said at least some rate subsets.

21. The method as recited in claim 20 wherein said calculating comprises calculating said power allocations using an equation that at least approximates:

$$P_{\pi(k)} = \gamma_{\pi(k)} \left[ \sum_{i=1}^{k-1} P_{\pi(i)} + N_k \right],$$

where:
- $\gamma_{\pi(k)} = \exp(2R_{\pi(k)}) - 1$, for a permutation $\pi$ of a subset $R_k$ of said predetermined set of allowed transmission rates,
- $P_{\pi(i)}$ is an allocated power associated with an $i^{th}$ rate in said permutation, and
- $N_k$ is a noise power level associated with a $k^{th}$ transmission rate in said subset.

22. The method as recited in claim 13 wherein said at least some rate subsets include subsets of single rates.

23. The method as recited in claim 13 further comprising calculating associated optimal noise levels for all rate subsets of said set.

24. The method as recited in claim 13 wherein a transmission standard determines said set.

* * * * *